US006365232B1

(12) United States Patent
Allen

(10) Patent No.: US 6,365,232 B1
(45) Date of Patent: Apr. 2, 2002

(54) ADHESIVE BOND TOOL HAVING IMPROVED RELEASE COATING FOR ADVANCED COMPOSITE AND METALLIC COMPONENTS AND METHOD

(75) Inventor: Gregory A. Allen, Highland, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/159,133

(22) Filed: Sep. 23, 1998

(51) Int. Cl.[7] .............................. B05D 3/00; B05D 3/02; B05D 3/12; B32B 15/08

(52) U.S. Cl. ....................... 427/318; 428/421; 428/422; 428/463; 427/299; 427/307; 427/309; 427/314; 427/327; 427/355; 427/368; 427/371; 427/375; 427/379; 427/385.5; 427/388.1; 427/388.4; 427/393.4; 427/407.1; 427/409

(58) Field of Search ................................ 428/421, 422, 428/460, 463; 427/299, 314, 318, 327, 355, 368, 371, 372.2, 388.1, 407.1, 409, 379, 375, 307, 309, 384, 385.5, 388.4, 393.4

(56) References Cited

U.S. PATENT DOCUMENTS 4,011,361 A * 3/1977 Vassiliou et al. ........... 428/422
4,016,125 A * 4/1977 Vassiliou et al. ....... 260/29.6 F
4,039,713 A * 8/1977 Vassiliou et al. ........... 428/324
4,049,863 A * 9/1977 Vassiliou ..................... 428/324
4,070,525 A * 1/1978 Vassiliou et al. ........... 428/422
4,546,141 A * 10/1985 Gebauer ..................... 524/401
5,250,356 A * 10/1993 Batzar ........................ 428/421
5,707,576 A * 1/1998 Asher ......................... 264/258

* cited by examiner

*Primary Examiner*—Vivian Chen
(74) *Attorney, Agent, or Firm*—Baker Botts L.L.P.

(57) ABSTRACT

Surface and thereafter applying a priming coating comprising a polytetrafluoroethylene solution containing a dispersed ceramic filler, wherein the priming coating is dried in two steps by first air-drying the coating, followed by force drying at elevated temperatures, wherein a second polytetrafluoroethylene coating is applied on the dried primer coating, and a third polytetrafluoroethylene coating is applied on the second coating while the second coating has not dried. The coated bond tool is baked to cure the second and third coatings. Prior to application of the priming coating, the metallic tool can be subjected to pretreatment such as pre-baking and grit blasting.

14 Claims, 2 Drawing Sheets

FIG. 1
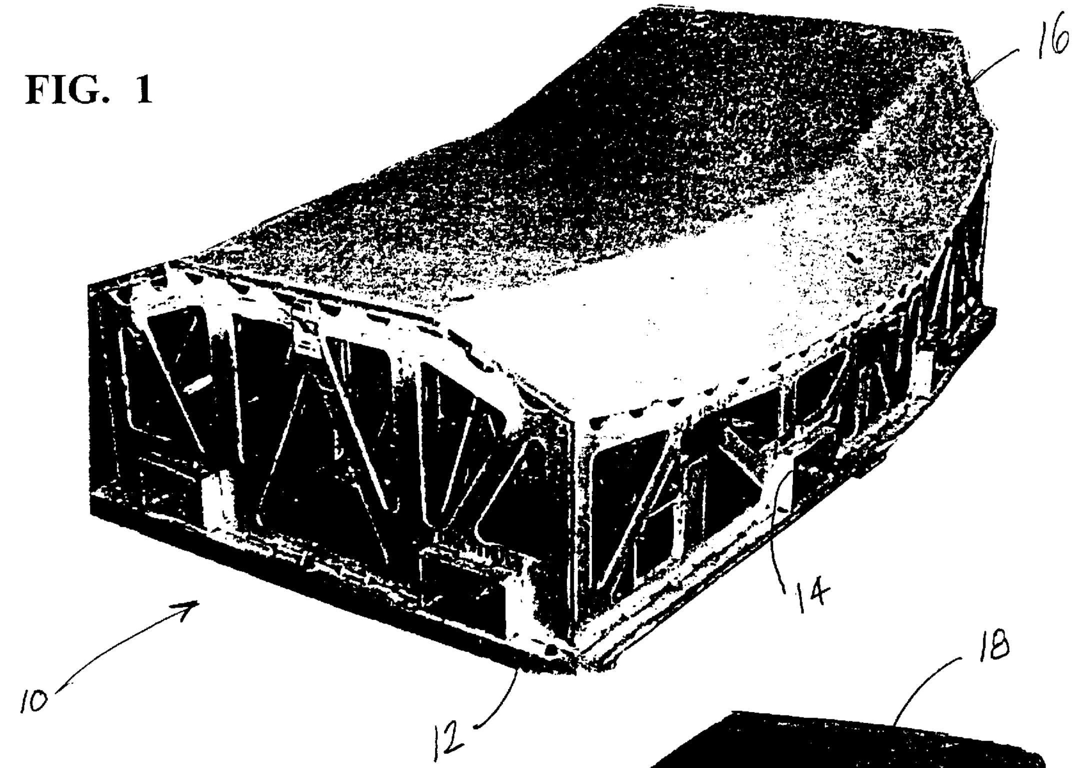
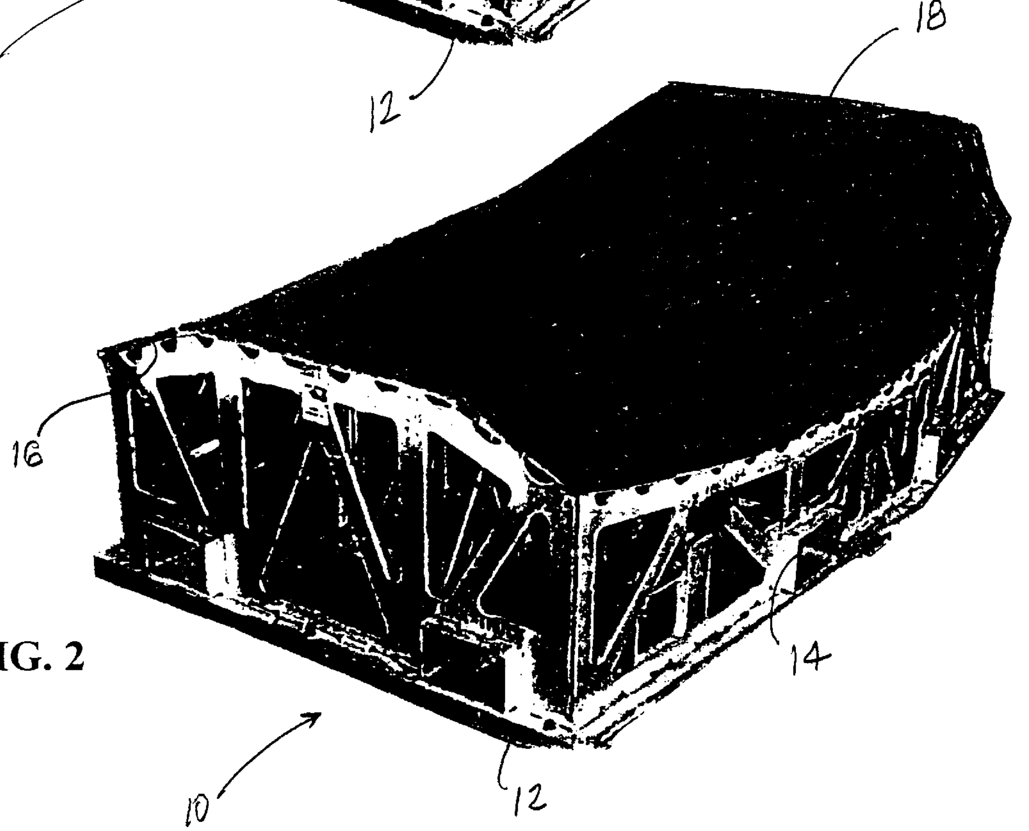
FIG. 2

ADHESIVE BOND TOOL HAVING IMPROVED RELEASE COATING FOR ADVANCED COMPOSITE AND METALLIC COMPONENTS AND METHOD

BACKGROUND OF THE INVENTION

1. Field of the Invention

The present invention is directed to an improvement in the fabrication of metallic and advanced composite components, and more particularly, but not by way of limitation to a metallic bond tool having an improved protective release coating for adhesively bonding metallic and advanced composite components on a bonding surface and its method of manufacture.

2. Description of the Related Art

It is known in the art of manufacturing adhesively bonded metallic and advanced composite components, such as those commonly used in aerostructures, to provide a metallic bond tool having at least one metallic bonding surface for receiving elements of the metallic and advanced composite component to be bonded together by being subjected to elevated temperatures and pressures. Such a metallic bond tool receives a protective release coating on such bonding surface as well as on any complementary item such as a throw in block or other detail that is positioned on such bonding surface to cooperate therewith in the positioning and adhesively bonding together of the metallic and advanced composite component.

At times such a metallic or advanced composite component will comprise a layer or layers of a carbon fiber material that has been pre-impregnated with an uncured resin material, such material being commonly known as "prepreg". Such initial layer or layers of prepreg are then followed by the layup thereon of other elements of the component such as a layer of metallic honeycomb core, detail parts, doublers and an overlay of plies of prepreg. The component is thus assembled on the bonding surface of the metallic bond tool and is subsequently covered by a flexible sheet or bag material which is sealed at its edge to the bonding surface of the bond tool with a suitable sealing material such as tape. The component is then considered to be "bagged". The bag is provided with various tubes which permit the pressure within such bag to be controlled and to permit the expulsion of volatiles when the bagged component secured to the bonding surface of the bond tool is positioned within an autoclave and subjected to an elevated temperature and elevated pressure in a predetermined timed cycle to cure a bonded component. A typical temperature would be 350° F. at 35 to 70 psi for a predetermined timed cycle. After the part has been cured the bond tool is removed from the oven and the bag material and tape are removed to permit the component to be removed from the bond tool for further processing.

Another typical metallic and advanced composite component that is manufactured in this manner is the example of positioning a metallic honeycomb core portion directly upon the bonding surface of the bond tool and then laying up layers of prepreg over such honeycomb core in a preferred orientation and then after performing the desired bagging this part is cured in the manner previously described. After debagging such part it is used in connection with the fabrication of a subsequent component.

Quite obviously it is desired to preclude to the greatest extent possible any tendency of the cured component to bond directly in any extent to the bonding surface and to also enhance the removal of the bagging tape and any residue remaining from the bagging and adhesive bonding operation. To accomplish these desired objectives, it is known to apply a protective release agent directly to the bonding surface. One example of such a protective release agent that is commonly used on such bonding tools is hand applied and air dried. However, such a material exudes environmentally undesirable emissions such as dibutylether during application and d-limone during cleaning. Further, such a release material has shown a tendency to transfer to bonding edges of the metallic honeycomb core in applications such as noted above and are difficult or impossible to easily remove thereby requiring the bonded part to be scrapped.

To overcome this problem it has been found necessary to provide as a release agent a non stretchable film containing a fiberglass scrim material. While this material precludes the transfer of the release coating material to the edges of the metallic honeycomb core portion, it is been found that such material is relatively easily damaged by the sharp edges of the honeycomb core and must be periodically replaced. To replace such material requires first the removal of such material in a operation that typically requires in excess of 8 worker hours and the subsequent replacement in a an operation that also requires 8–12 worker hours for a typical tool.

Other disadvantages of the use of such materials involves the cost and difficulty of the disposal of such hazardous wastes. The removal of such release materials from the metallic bonding surface involves laborious scraping and sanding that result in employee exposure to undesired particulates.

Thus, it is evident that a need exists for an improved release coating for the bonding tools used in the manufacture of advanced composite components, as for the aerospace industry, which overcomes the numerous problems associated with the known release coatings and which in addition to providing a release agent that has better release properties also is significantly more durable and thereby eliminating many of the environmental and safety issues presented by the release coatings presently employed.

It is therefore an objective of the present invention to provide a new and improved metallic bond tool having an improved protective release coating for adhesively bonding metallic and advanced composite components on a bonding surface and its method of manufacture.

SUMMARY OF THE INVENTION

The foregoing problems are overcome and other advantages are provided by a new improved metallic bond tool having an improved ceramic release coating.

Briefly stated, the present invention contemplates a process for making a metallic bond tool having a protective release coating for adhesively bonding metallic and advanced composite components in an autoclave at an elevated temperature and elevated pressure. The process includes the initial step of cleaning a metal bond tool having at least one metallic bonding surface for receiving elements of a metallic or advanced composite to be adhesively bonded together. This cleaning step is performed by heating the metallic tool to an elevated temperature to burn off any foreign residue or machining oil that might be present on the bond tool. The bond surface is then grit blasted with a suitable grit and blown dry with clean dry air. The bond surface is then lightly sanded as necessary to remove any remaining imperfections and blown clean.

The bond surface then receives a sprayed coat of a ceramic reinforced tetrapolyfluoroethylene primer solution to a desired uniform thickness. The primer coat is then air dried for a predetermined time and thereafter force dried in an oven at an elevated temperature that is below any temperature that would materially effect the metal characteristics such as by annealing such bond tool. The primer coat is then followed by application of a polytetrafluoroethylene containing mid coat solution that is sprayed on the bond tool surface in two box coats. The mid coat application is then followed by the application of a top coat of a polytetrafluoroethylene containing solution while the mid coat is still wet. The coated bond tool is air dried for a predetermined period of time and then cured in an oven at an elevated temperature that is sufficient to cure the mid and top coats and yet is below any temperature that might materially effect adversely the metal characteristics of the metallic bond tool.

The coated metallic bond tool is then buffed with a heavy organic cloth material and is then rinsed with water to remove any polytetrafluoroethylene dust generated by such buffing. Any bonding aids that would normally be secured to the bonding surface to assist in locating and positioning elements of the advanced composite component to be adhesively bonded together, such as throw in blocks, are coated in the same manner. Thus, the present invention provides a metallic bond tool that is provides an improved bonding surface that has excellent durability, does not transfer to the component being bonded together and easily releases elements such as tapes used to bag the advanced composite component for curing without leaving undue residue on the tool. Any residue left on the tool can be cleaned off within a few minutes thereby enabling the improved bond tool to be immediately recycled into production.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiments may be readily utilized as a basis for modifying or designing other structures and methods for carrying out the same purposes of the present invention. It should be also be realized by those skilled in the art that such equivalent constructions and methods do not depart from the spirit and scope of the invention as set forth in the appended claims.

BRIEF DESCRIPTION OF THE DRAWINGS

The foregoing aspects and other features of the invention are explained in the following description, taken in connection with the accompanying drawings, wherein:

FIG. 1 is a perspective of a metallic bond tool of the type employed in the practice of the present invention.

FIG. 2 is a perspective of the metallic bond tool of FIG. 1, the bonding surface of which has been coated with an improved ceramic release coating in accordance with the present invention.

DETAILED DESCRIPTION OF THE INVENTION

Figure 3:
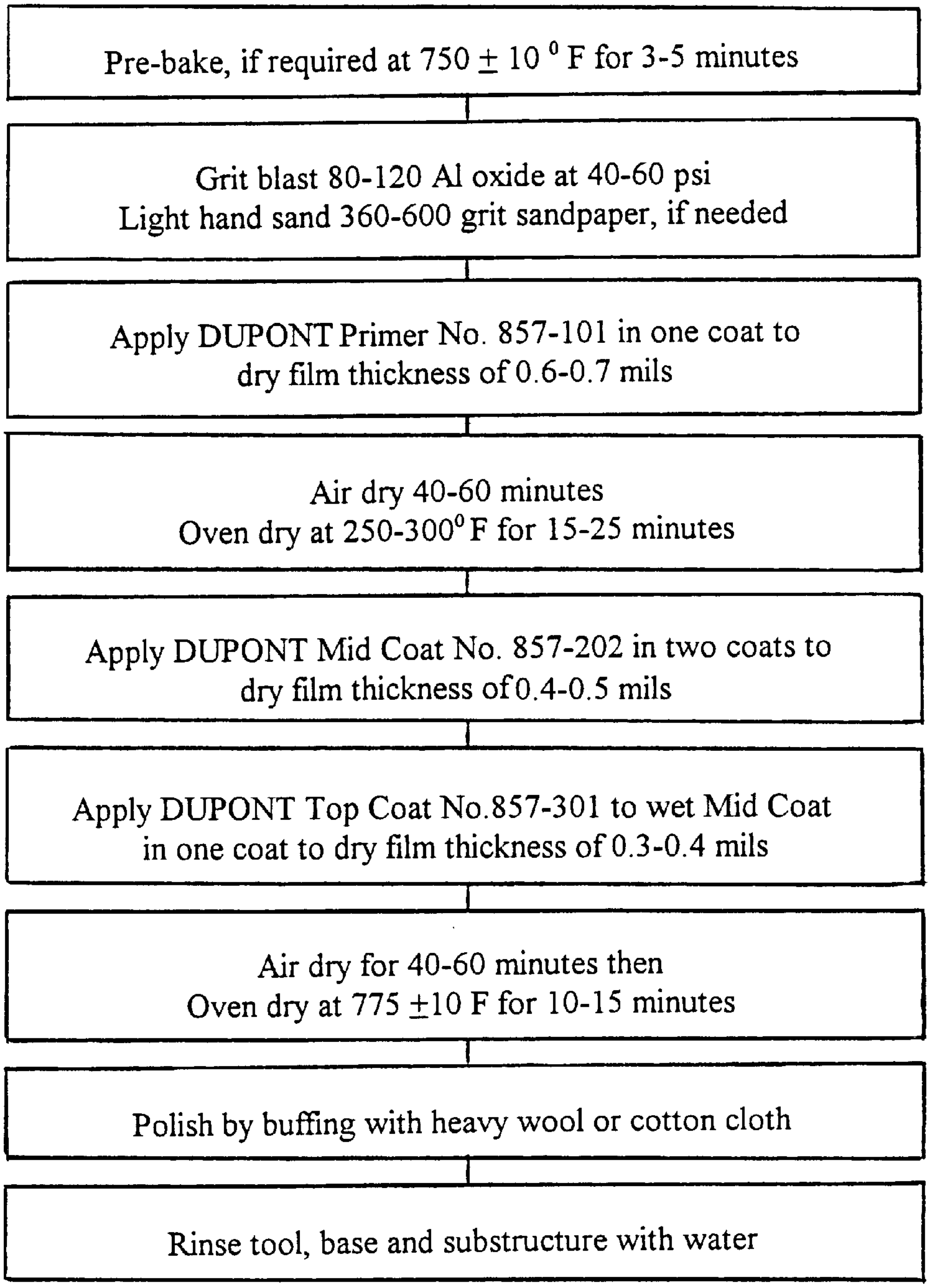
FIG. 3 is a flow chart of the process employed to provide the bonding surface of a metallic bond tool with an improved ceramic release coating.

Referring now to the drawings in detail and in particular to FIGS. 1 and 2, the reference character 10 generally refers to a metallic bond tool used in the practice of the present invention. The metallic bond tool 10 includes a suitable support base 12 adapted to be lifted by a fork lift means (not shown) for transport and positioning in a suitable autoclave. The support base 12 is provided with a substructure 14 comprising a plurality of welded ribs to which is affixed the bonding surface 16. The metallic bond tool 10 is illustrated as being exemplary of a bond tool used in the aerostructures industry to make advanced composite and metallic component that are adhesively bonded together on the bonding surface 16 in an autoclave at a predetermined cycle of elevated temperatures and pressures. FIG. 2 illustrates the metallic bond tool of FIG. 1 in which the bonding surface 16 has received a ceramic reinforced release coating 18 in accordance with the present invention.

In the practice of the present invention it must be stressed that certain facilities must be used and constant attention be given to maintaining cleanliness of the bond tool itself and of its surroundings. To employ the present invention, a suitable spray booth with a dry filter or water wash system must be provided as well as a grit blasting facility capable of using 80–120 grit aluminum oxide. An oven for receiving an object the size of a metallic bond tool and rated to 800° F. must also be provided.

Referring now to the flow chart of FIG. 1, a metallic bond tool 10 to which the improved release coating is to be applied to the bonding surface 16 is subjected to a pre-inspection to determine what steps must be taken to insure its cleanliness. If the metallic bond tool 10 has been previously utilized in bonding operations the previously utilized release coating must be removed as well as any obviously flammable materials adhering to the bonding surface 16. If the metallic bond tool 10 has not been provided with a release coating and used in production it still must be cleaned because of the residue remaining on the bonding surface 16 from machining oil used in the fabrication of such surface 16.

This initial cleaning is provided by pre-baking the metallic bond tool 10 in a suitable oven at a temperature of 750±10° F. for a period of 3–5 minutes. After the bond tool 10 has been allowed to cool it is then moved to the grit blast area. After the pre-bake operation has been completed it should be stressed that the tool 10 as well as other parts of the tool 10 to be coated should by handled with clean white gloves.

Following the pre-bake operation to burn off any foreign residue such as a previous release coating or machine oil, the bonding surface 16 of the bond tool 10 is subjected to grit blasting with 80–120 grit aluminum oxide at a pressure of 40–60 psi. The air used for grit blasting should be clean dry factory air. Following the grit blasting the bond surface 16 of an aluminum bond tool 10 should be lightly sanded with 400–600 grit sand paper to remove any remaining aluminum oxide particles and any surface imperfections. The bonding surface 16 of any steel bond tool 10 should be lightly sanded with 360 grit sand paper to remove any remaining aluminum oxide particles and any surface imperfections.

The bond tool 10 should be blown with clean dry air to make sure that all residue is blown from the bond surface 16 of the tool and care should be taken not to handle the bonding surface 16 to avoid introducing any contaminants thereto.

The next step is to apply by spraying, by means of a dedicated sprayer, a primer coat of a ceramic reinforced polytetrafluoroethylene primer on to the bonding surface 16 which has been suitably masked to avoid over spray. The primer is preferably TEFLON® PRIMER—BLACK made by the DuPont Co. of Wilmington, Del. 19098 and identified by it as Product Code 857–101. The Material Safety Data Sheet for this product indicates that it contains the following ingredients:

POLYTETRAFLUOROETHYLENE
AMORPHOUS SILICA
POLYAMIDE-IMIDE POLYMER
TETRAFLUOROETHYLENE/ PERFLUORINATED VINYLETHER
WATER
TRIETHYLAMINE
FURFURYL ALCOHOL
METHYL PYRROLIDONE
CARBON BLACK
SODIUM ALUMINUM SULPHO-SILICATE (ULTRAMARINE BLUE)
ALUMINUM OXIDE

This primer should be applied by a suitable spray gun to a dry film thickness of approximately 0.6–0.7 mils (15–18 microns). Following application of this primer to the bonding surface 16 the bond tool 10 should be air dried for a minimum of 40–60 minutes in a contamination free area and then placed in an oven. The temperature of the oven should then be increased from ambient to a temperature of 250–300° F. and held there for a time period of 15–25 minutes of force dry the primer. The tool 10 is then removed from the oven and permitted to cool to ambient temperature. This temperature is well below any temperature that would materially adversely effect the metal characteristics of the metallic bond tool 10.

The tool 10 is then moved back into the spray booth for application to the bonding surface 16 by spraying of a product identified as TEFLON® TOPCOAT—BLACK, Product Code No. 857–202 made by the DuPont Co. of Wilmington, Del. 19890. This product is noted in the applicable Material Safety Data Sheet as having the following ingredients:

POLYTETRAFLUOROETHYLENE
TETRAFLUOROETHYLENE/PERFLUORINATED VINYLETHER
ACRYLIC POLYMER
DIETHYLENE GLYCOL MONOBUTYL ETHER
OLEIC ACID
WATER
TRIETHANOLAMINE
AROMATIC HYDROCARBON
OCTYLPHENOXYPOLYETHOXYETHANOL SURFACTANT
CARBON BLACK
ALUMINUM OXIDE

This mid coat is applied with a suitable dedicated spray gun in two box coats to a dry film thickness of between 0.3–0.4 mils (10–13 microns) with the appearance of the bonding surface 16 after such application having a semi-wet look.

A top coat is then applied by a suitable dedicated spray gun to the semi-wet mid coat. This top coat is identified by the DuPont Co. as being TEFLON® TOPCOAT—CLEAR having a Product No. 857–301. This top coat is noted in the applicable Material Safety Data Sheet as having the following ingredients:

POLYTETRAFLUOROETHYLENE
ACRYLIC POLYMER
DIETHYLENE GLYCOL MONOBUTYL ETHER
OLEIC ACID
WATER
TRIETHANOLAMINE
AROMATIC HYDROCARBON
OCTYLPHENOXPOLYETHOXYETHANOL SURFACTANT

The noted top coat should be applied on the wet mid coat as a wet spray to a dry film thickness of 0.3–0.4 (8–10 microns) thereby resulting in a total dry film coating thickness for the bonding surface 16 of 1.3–1.6 mils (33–40 microns).

Following the application of the top coat to the bonding surface 16 the bond tool should be air dried in a contamination free area for 40–60 minutes, during which time all masking used to prevent over spraying of the base 12 or the substructure 14 should be removed.

The coated bond tool 10 should then be placed in a suitable oven having an ambient temperature and the temperature of the oven should then be increased to 775+10° F. and held there for a period of 10–15 minutes The upper temperature of the oven during such curing period is below a temperature that would materially adversely effect metal characteristics of the metallic bond tool 10 such as annealing. The oven should then be turned off and the doors opened to permit the coated bond tool 10 now having a bond surface 16 having the appearance seen in FIG. 2 to cool to a temperature where it can be safely removed from the oven.

The bonding surface 16 of the bond tool 10, after it has been allowed to cool to ambient temperature, should then be polished or buffed by a heavy organic cloth material such as cotton or wool. To ensure that any polytetrafluoroethylene dust is throughly removed from the bond tool 10, it should be thoroughly rinsed with water to ensure that all such dust is removed from the base 12, substructure 14 and the bonding surface 16.

Thus, the present invention provides a metallic bond tool that has an improved release coating on its bonding surface that has an excellent release property as well as durability and abrasion resistance. The present invention provides increased durability of the coating of the bonding surface by providing a coating having a coefficient of thermal expansion commensurate with that of the metal to the bonding surface 16. While the invention has been described with respect to the particular bonding surface of a metallic bond tool, the invention would also contemplate being used on other parts of the bond tool, such as throw in blocks, that are customarily used in the adhesive bonding of metallic and advanced composite aerostructure components.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts and method steps may be resorted to without departing from the spirit and scope of the invention.

What is claimed is:

1. A process for making a metallic bond tool having a protective release coating for adhesively bonding metallic and advanced composite components, the process comprising:

providing a metallic bond tool having at least one metallic bonding surface for receiving elements of a metallic or advanced composite component to be adhesively bonded together by being subjected to elevated temperatures and pressure; and applying a ceramic reinforced polytetrafluoroethylene release coating to said metallic bonding surface by first applying to said metallic bonding surface a priming coat by spraying thereon a polytetrafluoroethylene solution containing a dispersed ceramic material, thereafter applying a second coating comprising a polytetrafluoroethylene solution after said priming coating has been dried, wherein the drying of the priming coat includes permitting the priming coating to air dry for a predetermined period of time and thereafter subjecting the primer coated metallic bond tool to an elevated temperature for a predetermined period of time sufficient to force dry said priming coating without materially adversely effecting the metal characteristics of the metal bond tool, and thereafter applying a third coating comprising a polytetrafluoroethylene solution while the second coating has not dried.

2. The process according to claim 1 which further includes the step of baking the coated bond tool at a temperature for a period of time that is sufficient to cure said second and third coatings and which does not adversely effect metal characteristics of the metallic bond tool.

3. The process of claim 2 wherein the first coating is applied to a thickness of approximately 0.6 to 0.7 mils, the second coating is applied to a thickness of approximately 0.4 to 0.5 mils, and the third coating is applied to a thickness of approximately 0.3 to 0.4 mils.

4. The process of claim 1 which further includes the step, prior to application of said priming coating, of subjecting the uncoated metal bond tool to an elevated temperature for a period of time sufficient to burn off any foreign residue that may have been present on said bonding surface of said bond tool without materially adversely effecting the metal characteristics of said metallic bond tool.

5. The process of claim 4 which further includes the steps of grit blasting the bonding surface of said metallic bond tool following the heating step to burn off any foreign residue, and lightly sanding the bonding surface of said metal bond tool to remove any grit remaining from said grit blasting step and any other surface imperfections in said bonding surface.

6. The process of claim 5 which further includes the step of buffing the coated bonding surface following the curing of the third coating on said metallic bond tool with an organic cloth material to polish said coating, wherein the cloth material is selected from the group consisting of cotton and wool.

7. The process of claim 6 which further includes the step of rinsing said metallic bond tool provided with a protective release coating to remove any residue remaining on said coated bond tool following the polishing step.

8. The process of claim 1 wherein the step of providing a metallic bond tool includes forming said bond tool of an aluminum alloy.

9. The process of claim 1 wherein the step of providing a metallic bond tool includes forming said bond tool of a steel alloy.

10. A process for making a metallic bond tool having a protective release coating for adhesively bonding metallic and advanced composite components, which process comprises the steps of:

(a) providing a metallic bond tool having at least one metallic bonding surface for receiving elements of a metallic or advanced composite component to be adhesively bonded together by being subjected to elevated temperatures and pressure; and (b) applying a ceramic reinforced polytetrafluoroethylene release coating to said metallic bonding surface by:

(i) applying to said metallic bonding surface a priming coat by spraying thereon a polytetrafluoroethylene solution containing a dispersed ceramic material, wherein the drying of the priming coat includes permitting the priming coating to air dry for a predetermined period of time and thereafter subjecting the primer coated metallic bond tool to an elevated temperature for a predetermined period of time sufficient to force dry said priming coating without materially adversely effecting the metal characteristics of the metal bond tool, (ii) applying a second coating comprising a polytetrafluoroethylene solution after said priming coating has been dried, (iii) applying a third coating comprising a polytetrafluoroethylene solution while the second coating has not dried, and (iv) baking the coated bond tool at a temperature for a period of time that is sufficient to cure said second and third coatings and which does not adversely effect metal characteristics of the metallic bond tool.

11. The process of claim 10 which further includes the step, prior to application of said priming coating, of subjecting the uncoated metal bond tool to an elevated temperature for a period of time sufficient to burn off any foreign residue that may have been present on said bonding surface of said bond tool without materially adversely effecting the metal characteristics of said metallic bond tool.

12. The process of claim 11 which further includes the steps of grit blasting the bonding surface of said metallic bond tool following the heating step to burn off any foreign residue, and lightly sanding the bonding surface of said metal bond tool to remove any grit remaining from said grit blasting step and any other surface imperfections in said bonding surface.

13. The process of claim 12 which further includes the step of buffing the coated bonding surface following the curing of the third coating on said metallic bond tool with a heavy organic cloth material to polish said coating.

14. The process of claim 13 which further includes the step of rinsing said metallic bond tool provided with a protective release coating to remove any residue remaining on said coated bond tool following the polishing step.

* * * * *